United States Patent Office 3,692,502
Patented Sept. 19, 1972

3,692,502
METAL-COATED THERMOPLASTIC ARTICLE
Gunther Bernhardt, Hangelar, Robert Buning, Oberlar, and Werner Trautvetter, Spich, Germany, assignors to Dynamit Nobel AG, Troisdorf, Bezirk-Cologne, Germany
No Drawing. Continuation of application Ser. No. 718,904, Apr. 4, 1968. This application Oct. 29, 1970, Ser. No. 78,733
Claims priority, application Germany, Apr. 7, 1967, D 52,737
Int. Cl. B32b 15/08; C23b 5/60
U.S. Cl. 29—195          2 Claims

ABSTRACT OF THE DISCLOSURE

Substrates of copolymers of vinyl chloride with maleate or fumarate diesters are coated with metal by electroless deposition and then electroplated.

---

This application is a continuation of Ser. No. 718,904, filed Apr. 4, 1968, now abandoned.

It is known to produce various thermoplastic articles and then to provide a metal coating thereon. For example, ABS polymers, that is acrylonitrile-butadiene-styrene copolymers and copolymer mixtures, can be metallized by applying a thin copper or nickel coating onto the surface of shaped articles made therefrom. These coated articles are then metallized by electrochemical, galvanic means: cf. K. Stöckhert, "Kunststoffe," vol. 55, p. 857 (1965) and H. Wiegand and collaborators, "Kunststoffe," vol. 56, p. 773 (1966).

It is also known that substantially any thermoplastic or thermosetting polymer article which is inherently conductive can be electroplated with a suitable metal coating. In this regard it is known to load the thermoplastic article with conductivity improving materials such as graphite: cf. R. Uebigau, "Kunstoffe," vol. 49, p. 45 (1959). This process, however, has the disadvantage that the addition of graphite or of other electrically conductive substances usually weakens the mechanical strength of the plastic.

Vinyl chloride polymers do not generally have sufficient inherent conductivity to permit metallization thereof without the inclusion thereinto of conductivity-improving substances. As noted above, such inclusion is detrimental to the physical properties of the polymer and shaped articles made therefrom.

It is an object of this invention to produce a special vinyl chloride polymer suited to use as a metallization base.

It is another object of this invention to provide shaped articles from said polymer.

It is a further object of this invention to provide a metallized vinyl chloride polymer shaped article.

Other and additional objects of this invention will become apparent from a consideration of this entire specification, including the claims hereof.

In accord with and fulfilling these objects, one aspect of this invention resides in the provision of a copolymer of vinyl chloride with at least about 4 weight percent of a diester of maleic acid, fumaric acid, or a mixture of both. It has been found that shaped articles made from this copolymer are especially well adapted to have a metal coating placed thereon without the detrimental necessity of incorporating graphite or the like therein. It is preferred that the copolymer contains about 8 to 20 weight percent of the maleate and/or fumarate diesters.

Suitable maleate and/or fumarate diesters include those which have been esterified with alkyl radical having about 8 to 20 carbon atoms therein. Although straight chains are preferred, branched chain alkyl radicals are also within the scope of this invention. In this regard, the alkyl radicals may be exemplified by cetyl, octyl, decyl, dodecyl, hexadecyl, octadecyl, etc.

The vinyl chloride copolymers of this invention are suitably produced by standard vinyl chloride homo- and copolymerization techniques. These copolymers are formed into shaped articles by usual thermoplastic techniques such as extrusion, injection molding, compression molding, casting, etc. After formation of the shaped article, such is suitably metallized by formation thereon of a thin silver or copper coating by dipping the article in a silver or copper salt bath and reducing the silver or copper salt. The thus coated article is then electroplated.

The following example shows the preparation of a copolymer in accord with this invention:

EXAMPLE 1

The following materials are mixed:

4.2 liters of desalted water
190 ccm. of a 3% aqueous solution of the commercial product Tylose MH 50 (a cellulose methyl ether of low viscosity)
14.3 g. of dilauroyl peroxide
2.02 kg. of vinyl chloride
176 g. of fumaric acid dicetyl ester and placed in a 10-liter autoclave equipped with an agitator.

The contents of the autoclave are stirred by a 3-vane agitator (400 r.p.m.) at a temperature of 55° C. for a period of 20 hours. The copolymer is isolated by filtration or centrifugation, washed several times with water, and dried (Temperature 50° C.). The yield of copolymer runs around 90.

In like manner the copolymers of vinyl chloride and other fumaric acid diesters and/or maleic acid diesters can be prepared.

The copolymer produced according to Example 1 contained 8 weight percent fumarate and was formed into a 4 mm. thick sheet which was stabilized with a conventional barium-cadmium stabilizer. After stabilization, the sheet was prepared for metallization by the following treatment:

(1) Degreasing with 40% caustic soda solution.
(2) Etching with chromosulfuric acid (40 g. $K_2Cr_2O_7$) plus 20 g. of water plus 500 ccm. concentrated sulfuric acid at 60° C. for 60 minutes.
(3) Neutralization with 20% aqueous $NaHSO_3$.
(4) Sensitization with stannous chloride solution (35 g. $SnCl_2$ plus 50 ccm. concentrated HCl plus 1000 ccm. of water).
(5) Activation with silver nitrate solution (dissolve 2 g. $AgNO_3$ in water, add 10 ccm. ammonia (conc.) and add water to make 1 liter).

The thus prepared sheeting was then treated to provide a thin metal coating thereon. This was performed, for example, by combining the following solutions in a 1:1 ratio and then dipping the plastic into it:

Solution A 31.8 g. copper sulfate
8.2 g. nickel chloride
76.6 g. 37% aqueous formaldehyde solution
532 ccm. water Solution B 23.0 g. NaOH
95.5 g. potassium sodium tartrate
8.2 g. $Na_2CO_3$
532 ccm. water The copper electroplating is performed, for example, in an acid copper sulfate bath of 250 g. $CuSO_4$, 100 g.

sulfuric acid and 1000 ccm. water at a voltage of 0.5 volt. The metal layer was built up to 70 microns on the plastic material prepared in known manner.

Strength of adherence: 4.2 kg./25 mm. per DIN 40802.

Other metals such as Ag, Au, Ni, Cr or the like can be electroplated onto the ground coating of copper and/or nickel and/or silver, in a similar manner.

The chemical production of a nickel ground coat can be accomplished as follows: Immerse plastic at 90° C. in the following solution:

30 g. nickel chloride
10 g. sodium hypophosphite
100 g. sodium citrate and
50 g. ammonium chloride,
plus water to make 1000 ccm.
adjusted with ammonia to pH 8–10.

The chemical production of a silver ground coat is performed, for example, in a prior-art manner, by immersing the object in a silver salt solution to which a reducing agent has been added.

The following examples show various copolymers produced and coated according to the specific treatments set forth above.

EXAMPLE 2

Copolymer of vinyl chloride and fumaric acid distearyl ester (8 wt.-percent). Strength of adhesion: 3.6 kg. per 25 mm. according to DIN 40902 with etching at 60° C. for 30 minutes. Metal thickness: 80 microns.

EXAMPLE 3

Copolymer of vinyl chloride and fumaric acid didocetyl ester 8 wt.-percent). Strength of adhesion: 2.7 kg./25 mm. according to DIN 40902, with etching at 60° C. for 30 minutes. Metal thickness: 60 microns.

EXAMPLE 4

Copolymer of vinyl chloride and maleic acid dicetyl ester (8 wt.-percent). Strength of adhesion: 4.0 kg./25 mm. according to DIN 40802, with etching at 60° C. for 30 minutes. Metal thickness: 80 microns.

EXAMPLE 5

(Comparative Example)

Polyvinyl chloride: strength of adhesion less than 0.2 kg./25 mm. according to DIN 40802 with etching at 60° C. for 30 minutes. Metal thickness: 80 microns.

We claim:

1. A chemo-galvanically metal-coated shaped article comprising a thermoplastic substrate bearing a ground coat of silver or copper or nickel and a second layer of gold, silver, nickel, chromium or copper, said second layer being an electroplate and being in adhering contact with said ground coat, wherein said thermoplastic substrate is a copolymer of vinyl chloride with about 4 to 20 weight percent of at least one unsaturated diester selected from the group consisting of fumarates and maleates, which diester is an alkyl diester wherein the alkyl group contains about 8 to 20 carbon atoms.

2. Article as claimed in claim 1 wherein said ester is present in proportion of about 8 to 20 weight percent.

References Cited

UNITED STATES PATENTS

| | | | |
|---|---|---|---|
| 2,511,472 | 6/1950 | Kmecik | 29—195 P X |
| 3,524,754 | 4/1967 | Blytas et al. | 117—160 R X |
| 3,167,533 | 1/1965 | Donat | 260—86.3 |
| 2,439,654 | 4/1948 | Gaiser et al. | 117—138.8 UA X |
| 2,602,757 | 7/1952 | Kantrowitz et al. | 117—138.8 UA X |

OTHER REFERENCES

Narcus, Metallization of Plastics, Reinhold, 1960, pp. 44, 45.

RALPH HUSACK, Primary Examiner

U.S. Cl. X.R.

117—47 A, 71 R, 138.8 UA, 160 R; 204—20, 22, 38; 260—86.3